United States Patent
Fechtel et al.

(10) Patent No.: US 8,995,543 B2
(45) Date of Patent: Mar. 31, 2015

(54) METHOD AND DEVICE FOR CHANNEL ESTIMATION WITH COLLIDING INTERFERENCE CANCELLATION

(71) Applicants: Stefan Fechtel, Zorneding (DE); Andreas Bury, Dresden (DE)

(72) Inventors: Stefan Fechtel, Zorneding (DE); Andreas Bury, Dresden (DE)

(73) Assignee: Intel Mobile Communications GmbH, Neubiberg (DE)

( * ) Notice: Subject to any disclaimer, the term of this patent is extended or adjusted under 35 U.S.C. 154(b) by 14 days.

(21) Appl. No.: 13/930,726

(22) Filed: Jun. 28, 2013

(65) Prior Publication Data

US 2015/0003573 A1 Jan. 1, 2015

(51) Int. Cl.
*H04K 1/10* (2006.01)
*H04B 1/12* (2006.01)

(52) U.S. Cl.
CPC .................................... *H04B 1/12* (2013.01)
USPC .......................... 375/260; 375/259; 375/267

(58) Field of Classification Search
CPC ...... H04B 1/12; H04B 7/0626; H04B 1/7097; H04L 25/0202; H04L 27/01; H04L 5/0051; H04W 72/082
USPC .......... 375/260, 259, 267; 370/203, 204, 208, 370/209
See application file for complete search history.

(56) References Cited

U.S. PATENT DOCUMENTS

| | | | |
|---|---|---|---|
| 8,634,372 B2* | 1/2014 | Jitsukawa et al. | 370/330 |
| 8,717,862 B2* | 5/2014 | Xu | 370/201 |
| 2011/0038407 A1* | 2/2011 | Ki et al. | 375/232 |
| 2012/0224499 A1* | 9/2012 | Yoo et al. | 370/252 |

* cited by examiner

*Primary Examiner* — Dhaval Patel
(74) *Attorney, Agent, or Firm* — Schiff Hardin LLP (57) ABSTRACT

The method comprises receiving a signal comprising a symbol-carrier matrix, the symbol-carrier matrix comprising a predetermined pattern of reference symbols, the reference symbols comprising a target reference symbol, determining a first channel estimate vector based on demodulating received reference symbols with known reference symbols, and determining a second channel estimate vector by multiplying the first channel estimate vector with an interference cancellation matrix, wherein the second channel estimate vector includes an interference cancelled channel estimate at a position of the target reference symbol.

34 Claims, 5 Drawing Sheets

METHOD AND DEVICE FOR CHANNEL ESTIMATION WITH COLLIDING INTERFERENCE CANCELLATION

TECHNICAL FIELD

Embodiments described herein generally relate to multiple carrier communication systems, and more particularly to a method of channel estimation in a multiple carrier communication system, a method of interference cancellation in a multiple carrier communication system, a device for a multiple carrier communication system, and a user equipment for a multiple carrier communication system.

BACKGROUND

A multiple carrier communication system, in particular a wireless multiple carrier communication network, may include a number of base stations that can support communication for a number of user equipments (UEs). A UE may communicate with a base station via downlink and uplink. The downlink refers to the communication link from the base station to the UE, and the uplink refers to the communication link from the UE to the base station. The base station may transmit data and control information on the downlink to a UE and/or may receive data and control information on the uplink from the UE.

On the downlink a transmission from the base station may encounter interference due to transmissions from neighbor base stations. As the demand for mobile broadband access continues to increase, the possibilities of interference grows with more UEs accessing the long-range wireless communication networks and more short-range wireless systems being deployed in communities. This interference may degrade performance on both the downlink and uplink. Research and development continue to advance the technology not only to meet growing demand for mobile broadband access, but to advance and enhance the user experience with mobile communications.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Like reference numerals designate corresponding similar parts.

FIGS. 3a,b schematically illustrate a symbol-carrier matrix for a single-input-single-output (SISO) antenna configuration (a) and symbol-carrier matrices for a multiple-input-multiple-output (MIMO) antenna configuration (b).

DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

Heterogeneous networks may utilize a mix of diverse base stations deployed in order to improve the spectral efficiency per unit area. Such a layered network deployment can consist of regular placement of macro base stations that typically transmit at high power level (~5-40 W), overlaid with several pico cells, femto cells and relays that typically transmit at lower power levels (~100 mW-2 W). The lower power cells may be deployed to eliminate coverage holes in the macro cells and to provide efficiency in hot spots.

In heterogeneous networks, there may be a difference between low and high power base stations which can result in unfair distribution of data rates and uneven user experience among the user terminals in the network. Macro cell transmission can be restricted from using the same time-frequency resources as the low-power node by resource partitioning (enhanced Inter Cell Interference Coordination, eICIC). Resource partitioning can be either in frequency domain by using carrier aggregation or in time domain by using almost blank subframes (ABS).

The following terms, abbreviations and notations will be used herein:
eICIC: enhanced Inter-Cell Interference Coordination,
CRS: Cell specific Reference Signal,
GI: Guard Interval
RE: Resource Element,
IC: Interference Canceling,
MMSE: Minimum Mean Square Error,
AP: Antenna Port,
SINR: Signal to Interference and Noise Ratio,
LTE: Long Term Evolution,
LTE-A: LTE Advanced, Release 10 and higher versions of LTE,
RF: Radio Frequency,
UE: User Equipment,
MBSFN: Multicast/Broadcast over Single Frequency Network,
INR: Interference to Noise Ratio,
EVA: Extended Vehicular A channel,
QPSK: Quadrature Phase Shift Keying,
QAM: Quadrature Amplitude Modulation,
RBSF: Resource Block Subframe, i.e., a resource block in frequency direction times subframe in time direction,
BER: Bit Error Rate,
BLER: Block Error Rate,
EVA5: "Extended Vehicular A model" multi-path fading propagation conditions according to 3GPP technical Specification 36.101 V11.3.0, using a Doppler frequency of 5 Hz, ETU5: "Extended Typical Urban model" multi-path fading propagation conditions according to 3GPP technical specification 36.101 V11.3.0, using a Doppler frequency of 5 Hz.

The methods and devices described herein may be based on two-dimensional signal patterns and reference resource elements. It is understood that comments made in connection with a described method may also hold true for a corresponding device configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on an LTE and/or OFDM standard. The methods and devices described below may further be implemented in a mobile device (or mobile station or User Equipment (UE)) or in a base station (NodeB, eNodeB). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to about 300 GHz. The frequency range may correspond to frequencies of alternating current electrical signals used to produce and detect radio waves.

The methods and devices described herein may be designed to implement mobile standards such as e.g. the Long Term Evolution (LTE) standard. LTE, marketed as 4G LTE, is a standard for wireless communication of high-speed data for mobile phones and data terminals. It is based on the GSM/EDGE and UMTS/HSPA network technologies, increasing the capacity and speed using a different radio interface together with core network improvements.

In the following, Orthogonal Frequency-Division Multiplexing (OFDM) systems are described. OFDM is a scheme for encoding digital data on multiple carrier frequencies. OFDM has developed into a popular scheme for wideband digital communication, whether wireless or over copper wires, used in applications such as digital television and audio broadcasting, DSL broadband internet access, wireless networks, and 4G mobile communications. OFDM is a Frequency-Division Multiplexing (FDM) scheme used as a digital multi-carrier modulation method. A large number of closely spaced orthogonal sub-carrier signals may be used to carry data. The orthogonality may prevent cross-talk between sub-carriers. The data may be divided into several parallel data streams or channels, one for each sub-carrier. Each sub-carrier may be modulated with a conventional modulation scheme (such as quadrature amplitude modulation or phase-shift keying) at a low symbol rate, maintaining total data rates similar to conventional single-carrier modulation schemes in the same bandwidth. OFDM may be essentially identical to coded OFDM (COFDM) and discrete Multi-Tone modulation (DMT).

Figure 1:
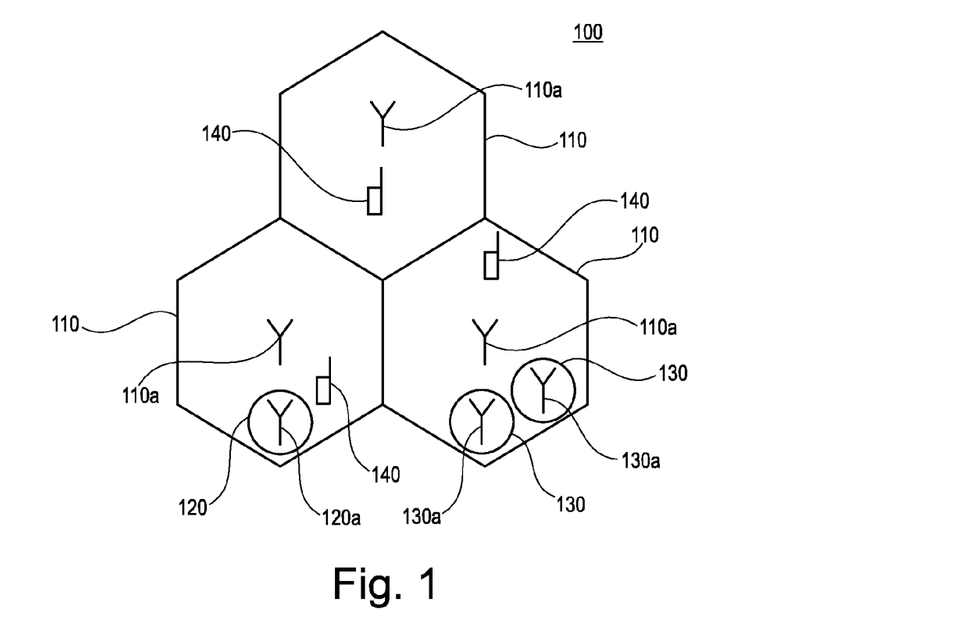
FIG. 1 illustrates a schematic diagram of a mixed homogeneous and heterogeneous network including macro cells, pico cells, and femto cells.

FIG. 1 shows a wireless communication network 100 which includes a number of cells 110, 120, 130, among them macro cells 110, pico cells 120, and femto cells 130, for example. Each one of the macro cells 110 include a base station 110a, each one of the pico cells include a base station 120a, and each one of the femto cells 130 include a base station 130a. A macro cell 110 generally covers a relatively large geographic area (e.g., several kilometers in radius), a pico cell 120 would generally cover a relatively smaller geographic area, and a femto cell 130 would also generally cover a relatively small geographic area (e.g., a home). The different types of base stations 110a, 120a, and 130a may have different transmit power levels, different coverage areas, and different impact on interference in the wireless network 100. The embodiments described in the following are applicable to homogenous networks, heterogeneous networks, and mixed homogeneous and heterogeneous networks.

The UEs 140 are dispersed throughout the wireless network 100, and each UE 140 may be stationary or mobile. A UE 140 may be a cellular phone, a personal digital assistance (PDA), a wireless modem, a wireless communication device, a handheld device, a laptop computer, a cordless phone, a wireless local loop station, a tablet or the like. A UE 140 may be able to communicate with one or more of the base stations 110a, 120a, and 130a of the macro cells 110, the pico cells 120, or the femto cells 130. At each point in time of a wireless connection of a UE 140, one of the cells acts as a serving cell whereas other cells in the vicinity of the serving cell act as neighbouring cells which means that interfering transmissions may occur between the UE 140 and one or more of the neighbouring cells.

The wireless communication network 100 can be based on the LTE standard. LTE may utilize orthogonal frequency division multiplexing (OFDM) on the downlink.

Cellular networks such as LTE are characterized by high frequency reuse (maximizing network capacity) and thus high levels of inter-cell interference. This problem is aggravated in heterogeneous networks (HetNets) where macro- and pico-/femtocells must coexist on the same spectrum. User equipment (UE) mobile terminals are subject to strong co-channel interference originating from the multiple base stations (BS, or evolved node-B (eNB)) like those shown in FIG. 1, which calls for advanced solutions for cancelling or mitigating strong co-channel interference signals on the physical level.

Figure 2:
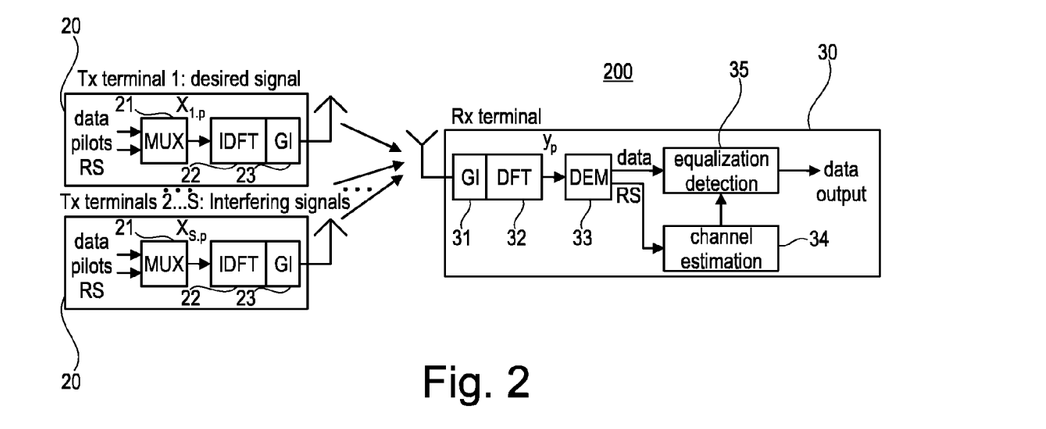
FIG. 2 shows a schematic block representation of a basic OFDM transmission system with downlink inter-cell interference.

FIG. 2 shows an exemplary (MIMO) OFDM transmission system 200 subject to inter-cell interference from S sources (one desired signal, S-1 interferers).

Each eNB transmitter (Tx) 20 comprises a multiplexer 21 for multiplexing between data and pilot symbols, an IDFT (inverse discrete Fourier transform) unit 22 for performing an inverse Fourier transform on the data or pilot symbols, and a GI (Guard Interval) unit 23 for adding a guard interval to the OFDM symbol, and forms a sequence of one or more (MIMO) parallel OFDM symbol streams (stream/antenna index dropped here for clarity), where each OFDM symbol originating from terminal s (index s=1, ..., S) comprises K frequency-domain subcarrier samples $x_{s,p}$, where p=(l,k) is the 2D position of a resource element (RE) with OFDM symbol (time) index l=0, 1, 2, ... and subcarrier (frequency) index k=0, ..., K−1. Typically, many of the input samples $x_{s,p}$ are payload data symbols (PSK/QAM), others are pilot or reference symbols (RS) multiplexed into the data stream for the purpose of channel estimation. In the UE receiver (Rx) 30, the received signal is transformed back to frequency domain via a K-DFT (discrete Fourier transform) OFDM demodulator 32. For the relevant eICIC case of synchronous inter-cell interference, the received and OFDM-demodulated signal (demodulator 33) (here per MIMO OFDM symbol stream) is given as $$y_p = \sum_{s=1}^{S} \underbrace{h_{s,p} x_{s,p}}_{y_{s,p}} + n_{,p} \tag{1}$$

$$s = 1, \ldots, S,$$
$$p = (l, k),$$
$$l = 0, 1, 2, \ldots,$$
$$k = 0, \ldots, K-1$$

with $x_{s,p}$ and $y_p$ the transmitted and received QAM/PSK symbols, respectively, $h_{s,p}$ the 2D channel transfer function samples, and $n_p$ the additive noise. Outputs of the demodulator 33 are connected with a channel estimation unit 34 and an equalization detection unit 35. For regularity and near-uniform performance of channel estimation, reference symbols (RS) are typically arranged in a regular pattern, as shown in the following.

Figure 3:
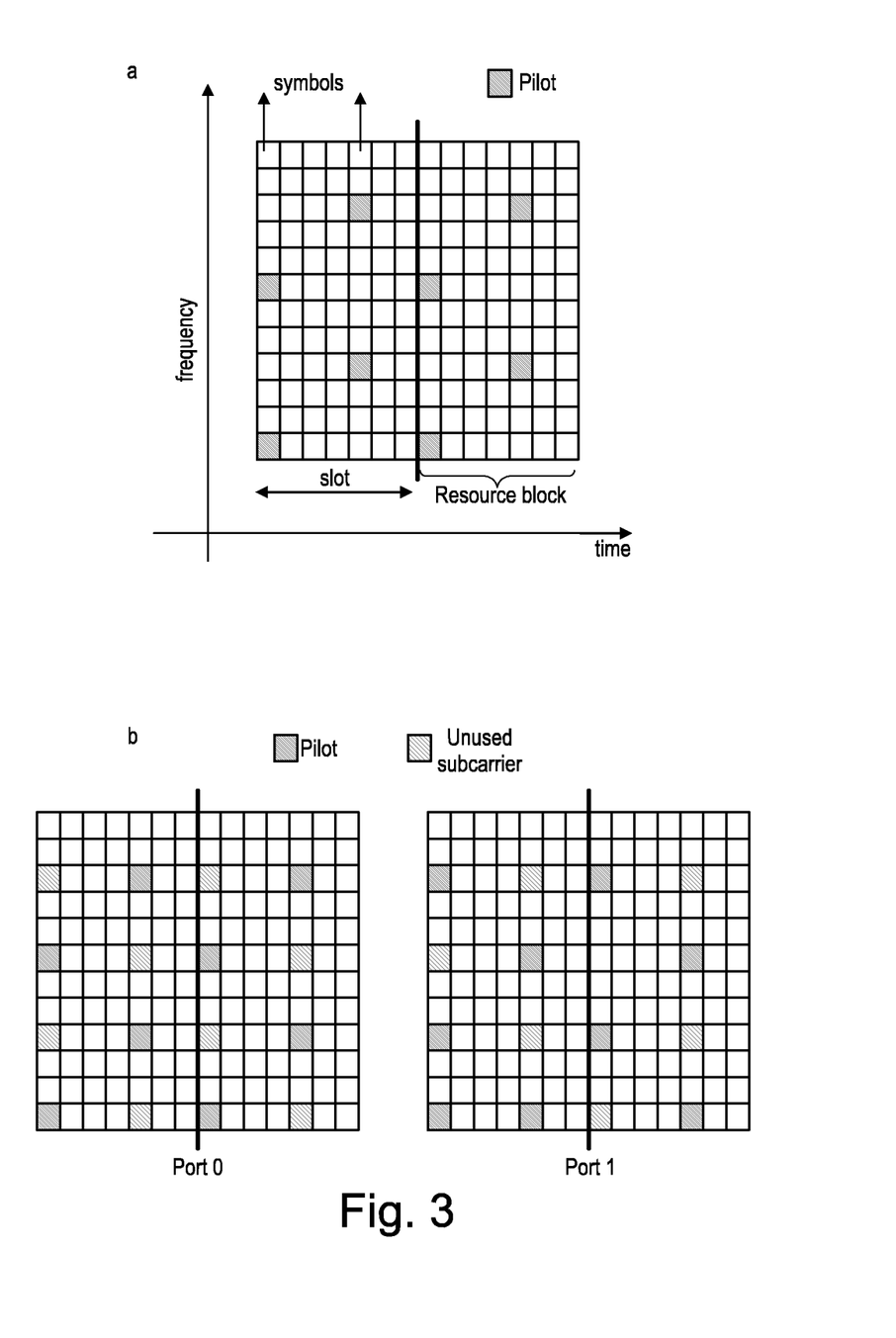

Referring to FIG. 3a,b, there is shown a schematic representation of a symbol-carrier matrix for a SISO configuration (a) and for a MIMO 2×2 configuration. In order to facilitate channel estimation, known symbols, called pilots, are inserted at specific locations in the time-frequency grid of the symbol-carrier matrix. The resulting two-dimensional pilot pattern is shown in FIG. 3a in a case where the pilot spacing in frequency direction equals six OFDM symbols, while in time direction there are two OFDM symbols per slot containing pilots, at a distance of 4 and 3 OFDM symbols from one another.

FIG. 3b illustrates the pilot grid for a 2×2 antenna configuration. When antenna port 0 is transmitting its pilot symbols, the other antenna is silent. This implies that pilot transmissions from the two antenna ports are completely orthogonal, i.e. MIMO channel estimation is a straightforward extension of SISO channel estimation techniques.

In the presence of synchronous inter-cell interference, interfering RE signals $y_{2 \ldots S,p}$ collide with the wanted RE signal $y_{1,p}$ (eq. 1). So-called aggressor CRS may collide with either wanted CRS or wanted data symbols. The former case of colliding CRS (C-CRS) is of particular interest here.

In LTE, the CRS of different cells are modulated differently, i.e., CRS symbols $x_{s,p}$ are taken from pseudo-random PSK/QAM (here QPSK) sequences which are different for signals s=1, . . . , S. Via their cell-IDs (detected by cell search), all relevant colliding CRS transmit signals (wanted or interferers) are known. The disclosure presents a new method of estimating the set of unknown fading channel samples $h_{s,p}$ of all signals (both wanted and interfering), given received CRS samples $y_p$, the CRS modulation sequences $x_{s,p}$, and some knowledge of fading channel time/frequency selectivity statistics (Doppler spectra, delay power profiles).

Figure 4:
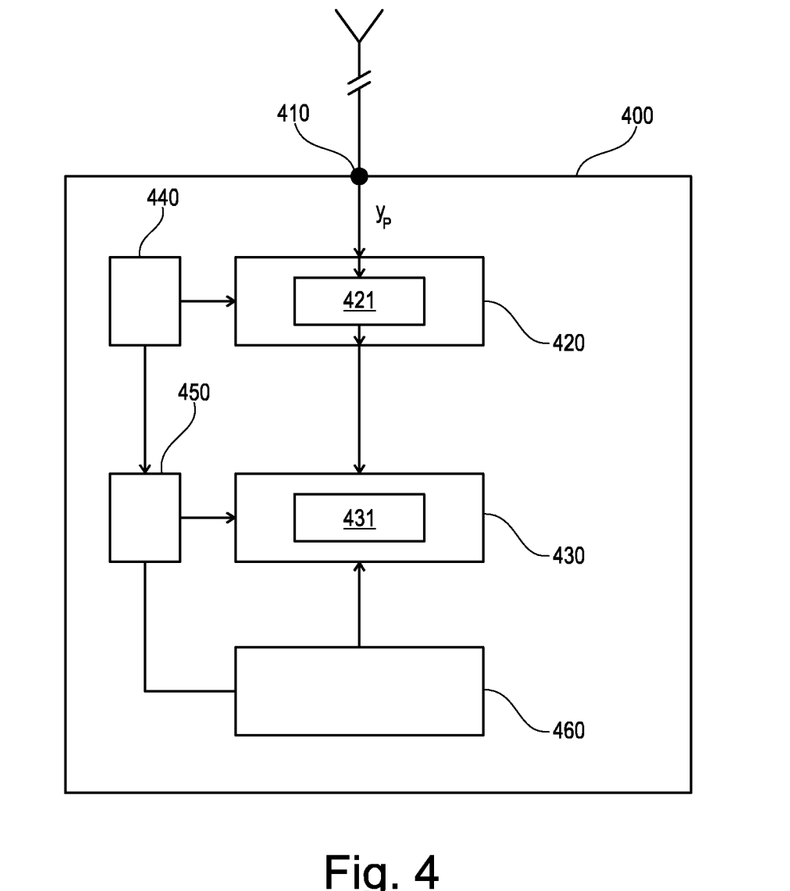
FIG. 4 shows a schematic block representation of an exemplary device for a multiple carrier communication system.

FIG. 4 shows a schematic block diagram for illustrating a device for a multiple carrier communication system according to an example. As explained before, the communication system comprises a number of sources S disposed in a serving cell and at least one neighbouring cell, respectively. The device 400 of FIG. 4 comprises an antenna port 410 configured to receive from antenna connected to the antenna port 410 a signal $y_p$ comprising a symbol-carrier matrix such as that depicted in one of FIGS. 3a,b. The symbol-carrier matrix comprises a predetermined pattern of reference symbols like, for example, cell reference symbols (CRS), wherein the reference symbols comprise a target reference symbol for which an interference cancelled channel estimate is to be determined.

The device 400 of FIG. 4 further comprises a first channel estimation unit 420 configured to determine a first channel estimate vector based on demodulating the received reference symbol $y_p$ with known reference symbols, i.e. known transmitted bit sequences representative of the different sources.

The device 400 of FIG. 4 further comprises a second channel estimation unit 430 configured to determine a second channel estimate vector by multiplying the first channel estimate vector with an interference cancellation matrix, wherein the second channel estimate vector includes an interference cancelled channel estimate at a position of the target reference symbol.

The device 400 of FIG. 4 may further comprise at least one demodulation unit 421 configured to demodulate received reference symbols $y_p$ with known reference symbols, i.e. known bit sequences. The demodulation unit 421 can be part of the first channel estimation unit 420 or alternatively it can also be arranged separate from the first estimation unit 420 in the device 400. As will be shown later, a number of demodulation operations have to be carried out with the known bit sequences of the different sources. These demodulation operations can either be carried out simultaneously in a respective number of different demodulation units or the demodulation operations can be carried out successively by using one single demodulation unit operating in a multiplex mode.

The device 400 of FIG. 4 may further comprise a first storage unit 440 configured to store weight components of a number N of reference symbol positions including the target reference symbol and N−1 reference symbols disposed in an environment of the target reference symbol in the symbol-carrier matrix. The storage unit 440 may be connected with the first estimation unit 420 for delivering the weight components to the first estimation unit 420. The first estimation unit 420 may further be configured to utilize the weight components for determining the first channel estimates. Further details will be explained below.

The device 400 of FIG. 4 may further comprise a second storage unit 450 configured to store an interference cross-talk matrix and a calculation unit 460 configured to calculate the interference cancellation matrix on the basis of the interference cross-talk matrix. The second storage unit 450 may be coupled to the calculation unit 460 in order to deliver the interference cross-talk matrix to the calculation unit 460, and the calculation unit 460 may be coupled to the second estimation unit 430 in order to deliver the calculated interference calculation matrix to the second estimation unit 430. Furthermore, the second channel estimation unit 430 may comprise a calculation unit 431 configured to calculate the second channel estimate vector on the basis of the first channel estimate vector and the interference cancellation matrix, as will be shown later.

Figure 5:
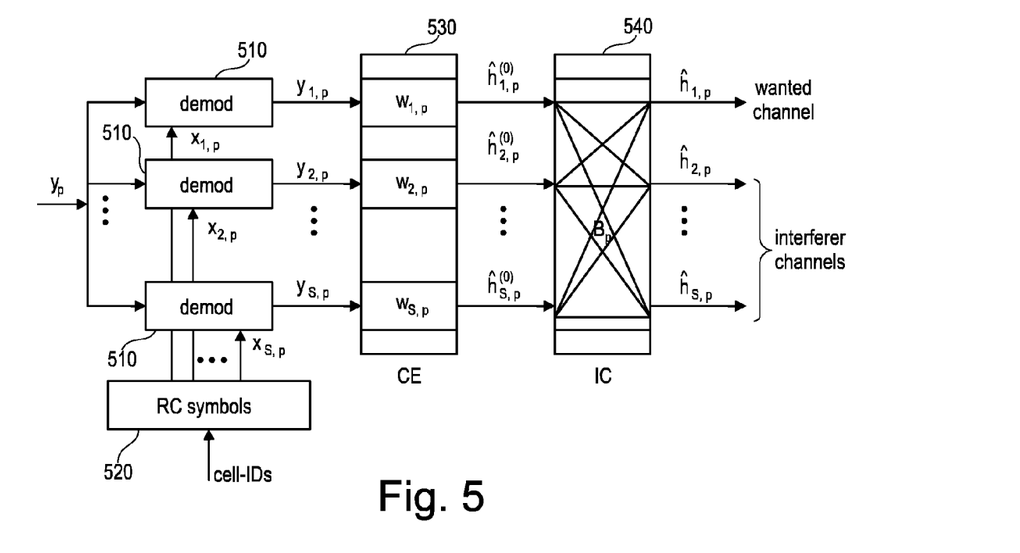
FIG. 5 shows a schematic block representation for illustrating an example of a channel estimation and an interference cancellation.

FIG. 5a shows a schematic block diagram for illustrating a method of channel estimation in a multiple carrier communication system according to an embodiment.

The method comprises the following two principal elements, namely 1) channel estimation, followed by 2) interference cancellation of the channel estimator output.

1) Channel Estimation

In a first step, all colliding wanted and interferer RS channels $h_{s,p}$ are estimated at selected symbol positions as if they were undisturbed by the other colliding RS signals. In particular, the received signal samples $y_p$ are first demodulated using the known transmitted sequences $x_{s,p}$, resulting in S demodulated signals $y_{s,p}$ (see eq. 2a). The demodulation operations are represented in FIG. 5 by different demodulation blocks 510 which may be supplied with the symbol $y_p$ simultaneously. However there can also be provided one single demodulator stage which performs successive demodulating operations with different known sequences. The sequences can be stored in an RS symbol storage unit 520 which outputs a respective sequence upon input of a specific cell-ID. Channel estimation filtering (see eq. 2b) is then performed on sets of N demodulator output RS samples $y_{s,p}$, yielding vectors $\hat{h}_p^{(0)}$ of S first channel estimates $\hat{h}_{s,p}^{(0)}$:

Demodulation:

$$y_{s,p} = y_p / x_{s,p}, \; s=1,\ldots,S \quad (2a)$$

Channel Estimation (CE):

$$\hat{h}_p^{(0)} = [\hat{h}_{1,p}^{(0)} \ldots \hat{h}_{S,p}^{(0)}]^T \text{ with } \hat{h}_{s,p}^{(0)} = w_{s,p}^T y_{s,p}, \; y_{s,p} = [y_{s,p_1} \ldots y_{s,p_N}]^T \quad (2b)$$

In block 530 scalar products between symbol vectors and weight vectors are formed for each one of the N reference symbol positions $p_1 \ldots p_N$. The components of each one of the vectors are associated with one of the sources s. The CE filter weight vectors $w_{s,p}$, which are in general distinct for each filtering/interpolation position p and possibly also for each individual channel s, characterize any of the conventional linear estimation schemes, e.g., MMSE/Wiener filtering, IIR filtering, etc. The dimension N of CE filtering is usually relatively large, in particular N can be greater than 20, in particular greater than 30, more particular greater than 40, more particular greater than 50, more particular greater than 60 (see also FIG. 6).

Figure 6:
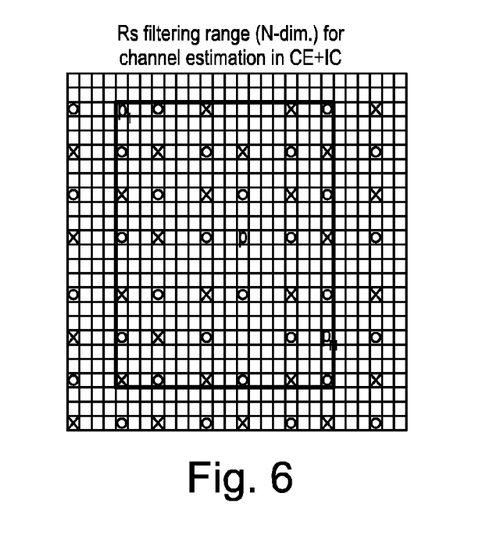
FIG. 6 shows a symbol-carrier matrix including a target reference symbol and a number of further reference symbols for illustrating a filtering process for the channel estimation and the interference cancellation.

As shown in FIG. 6, $p_1 \ldots p_N$ denote the reference symbols in an environment of the target reference symbols, wherein the reference symbols $p_1 \ldots p_N$ are intended to take part in the filtering process. The target reference symbol p can be situated in a center of the N reference symbols.

2) Interference Cancellation

For each stage-1 output position p=(l,k), the vector of first channel estimates $\hat{h}_p^{(0)}$ is processed by a second stage in block 540 in order to cancel the interference cross-talk left in $\hat{h}_p^{(0)}$ after stage 1. According to this disclosure, a second channel estimate is generated by linear mapping, i.e., the length-S vector $\hat{h}_p^{(0)}$ is filtered by an S×S interference cancellation matrix $B_p$ to produce a second, interference-cancelled final channel estimate $\hat{h}_p$:

Interference Cancellation (IC):

$$\hat{h}_p = B_p \cdot \hat{h}_p^{(0)} \quad (3)$$

The S×S interference cancellation matrix $B_p$ is linked with the post-CE transmission model $$\hat{h}_p^{(0)} = A_p \bar{h}_p + n_p \quad (4)$$

with interference cross-talk matrix $A_p$, undisturbed channel estimate $\bar{h}_p = [\bar{h}_{1,p} \ldots \bar{h}_{S,p}]^T$ (channel $\bar{h}_{s,p} = w_{s,p}^T h_{s,p}$ produced by CE filtering (eq. 2b) of the true channel vector $h_{s,p}$), and effective noise $n_p$ (CE-filtered noise). The elements of cross-talk matrix $A_p$ can be well approximated as $$a_{sq,p} = (A_p)_{sq} \cong \frac{w_{s,p}^T d_{sq,p}}{w_{q,p}^T \cdot 1} \text{ with} \quad (5)$$

$$d_{sq,p} = \begin{bmatrix} d_{sq,p_1} \\ \vdots \\ d_{sq,p_N} \end{bmatrix},$$

$$d_{sq,p} = \frac{x_{q,p}}{x_{s,p}}$$

$$(s, q = 1, \ldots, S)$$

Computation of $A_p$ thus calls for CE-filtering of differential CRS modulation symbol vectors $d_{sq,p}$. For distinct length-N pseudo-random modulation sequences, the off-diagonal elements $a_{sq,p}$ are small (albeit not negligible) relative to the main diagonal elements which are unity ($a_{ss,p}$=1). Hence, $A_p$ is well-conditioned with very high probability, and so is filtering matrix $B_p$ computed from $A_p$ via standard optimization criteria (see examples below).

As for complexity, CE filtering has to be executed several times: S times on demodulator output $y_{s,p}$ to produce first estimates $\hat{h}_p^{(0)}$ (eq. 2b), and S(S−1) times on sequences $d_{sq,p}$ to obtain the off-diagonal elements $a_{sq,p}$ of $A_p$ (eq. 5) (the alternative of precomputing $a_{sq,p}$ for all CE filters $w_{s,p}$ and all variations of $d_{sq,p}$ is in practice not feasible). For QPSK-modulated CRS (LTE), the latter simplifies to S(S−1)/2 accumulations of CE filter coefficients weighted by factors ±1 and ±j. Computing IC matrix $B_p$ (based on (eq. 4)) and producing final estimates $\hat{h}_p$ (eq. 3) calls for matrix operations, but the dimension S is typically small and scales with the number of interferers. If only the wanted channel is of interest, (eq. 3) boils down to $\hat{h}_p = b_p^T \cdot \hat{h}_p^{(0)}$ ($b_p^T$ first row of $B_p$). Also, interference-cancelled estimates $\hat{h}_p$ only need to be generated for a subset which is typically much smaller than the entire set of RE positions (ratio 1:12 for LTE regular grid). From these subset estimates {$\hat{h}_p$}, final channel estimates for all other RE positions are easily obtained through conventional channel interpolation.

The main advantages of the new CE+IC scheme (eqs. 2 and 3) are the following:

CE+IC performance: CE filtering does not incur a loss of information since the CE output $\hat{h}_p^{(0)}$ is, in conjunction with transmission model (eq. 4), a sufficient statistic also for interference cancellation. Therefore, channel estimation performance does not degrade severely in the presence of channel time/frequency selectivity. This is the principal advantage of the new CE+IC scheme over state-of-the-art IC+CE processing.

CE+IC regularity: online reconfigurations (e.g., sizes N, S) for the sole reason of circumventing badly conditioned IC matrix operations are no more required.

CE reuse and versatility: the estimator design hitherto used for conventional non-interfered channel estimation may remain unchanged despite the presence of strong interference. This applies not only to the filters $w_{s,p}$ designed as if no interference were present (targeting the SNR, not the SINR) but also to the estimator type and configuration: any kind of linear CE filtering (2D, IIR, etc.), including local reconfigurations to cater for special cases (spectral edges, DC, frame boundaries, etc.), can be (re)used, provided that, for a particular target position p, modulation sequences $d_{sq,p}$ are CE-filtered in the same way (eq. 5) as the demodulator output signals $y_{s,p}$ (eq. 2b).

IC robustness: as the cross-talk matrix $A_p$ (eq. 5) is deterministic in nature (depending on known quantities ($w_{s,p}$, $d_{sq,p}$)), IC filtering via $B_p$ (eq. 3) is insensitive to noise or interference.

From the model according to eqs. 4 and 5 and an optimization criterion, for example, ZF (zero-forcing) or MMSE, IC matrix $B_p$ and associated post-IC channel error covariance $$\sum_{\bar{h}_p - \hat{h}_p}$$

are readily computed as $$\text{ZF-IC:} \quad B_p = A_p^{-1} \sum_{\bar{h}_p - \hat{h}_p} = A_p^{-1} R_{n_p} A_p^{-H} \quad (6a)$$

$$\text{MMSE-IC:} \quad B_p = PA_p^H(A_p PA_p^H + R_{n_p})^{-1} \sum_{\bar{h}_p - \hat{h}_p} = P - PA_p^H(A_p PA_p^H + R_n)^{-1} A_p P \quad (6b)$$

with $P=\text{diag}(\sigma_1^2, \ldots, \sigma_S^2)$ containing the powers of wanted/interfering signals.

In large networks, propagation delays $\tau_s$ of interfering signals may be substantially different. If such differential delay shifts are in the order of the channel delay spreads or larger, it is advantageous to apply individual delay shift compensation (see eq. 7a) to the demodulator output signals before entering channel estimation (see eq. 7b) (operating on delay-shift-compensated signals $\bar{y}_{s,p}$) and interference cancellation based on cross-talk matrix $A_p$ modified according to (see eq. 7c):

Delay Shift Compensation:

$$\bar{y}_{s,p} = \omega^*_{s,p} \circ y_{s,p} \quad (7a)$$

with $$\omega_{s,p} = [\omega_{s,p_1}, \ldots, \omega_{s,p_N}]^T,$$

$$\omega_{s,p_n} = e^{-j2\pi f_{sc}\tau_s(k_{p_n}-k_p)}$$

Channel Estimation:

$$\hat{h}_p^{(0)} = [\hat{h}_{1,p}^{(0)} \ldots \hat{h}_{S,p}^{(0)}]^T \text{ with } \hat{h}_{s,p}^{(0)} = w_{s,p}^T \bar{y}_{s,p} \quad (7b)$$

Interference Cancellation Cross-Talk Matrix:

$$a_{sq,p} = (A_p)_{sq} \cong \frac{(w_{s,p} \circ \omega^*_{s,p})^T \cdot d_{sq,p}}{w_{q,p}^T \cdot \omega^*_{q,p}} \quad (7c)$$

$$(s, q = 1, \ldots, S)$$

In eq. 7, phasor vector $\omega_{s,p}$ reflects the effect of a time-domain shift $\tau_s$ on frequency-domain CRS samples (subcarrier spacing $f_{sc}$) at positions $p_n=(l_n,k_n)$ relative to reference position p. By virtue of delay shift compensation, the CE filters matched to the channel delay spread (disregarding delay shifts) can be reused. Provided that reasonably accurate differential delay shift estimates are available and these remain inside the OFDM guard interval, CE+IC performance turns out to be virtually the same as if no delay differences were present.

Figure 7:
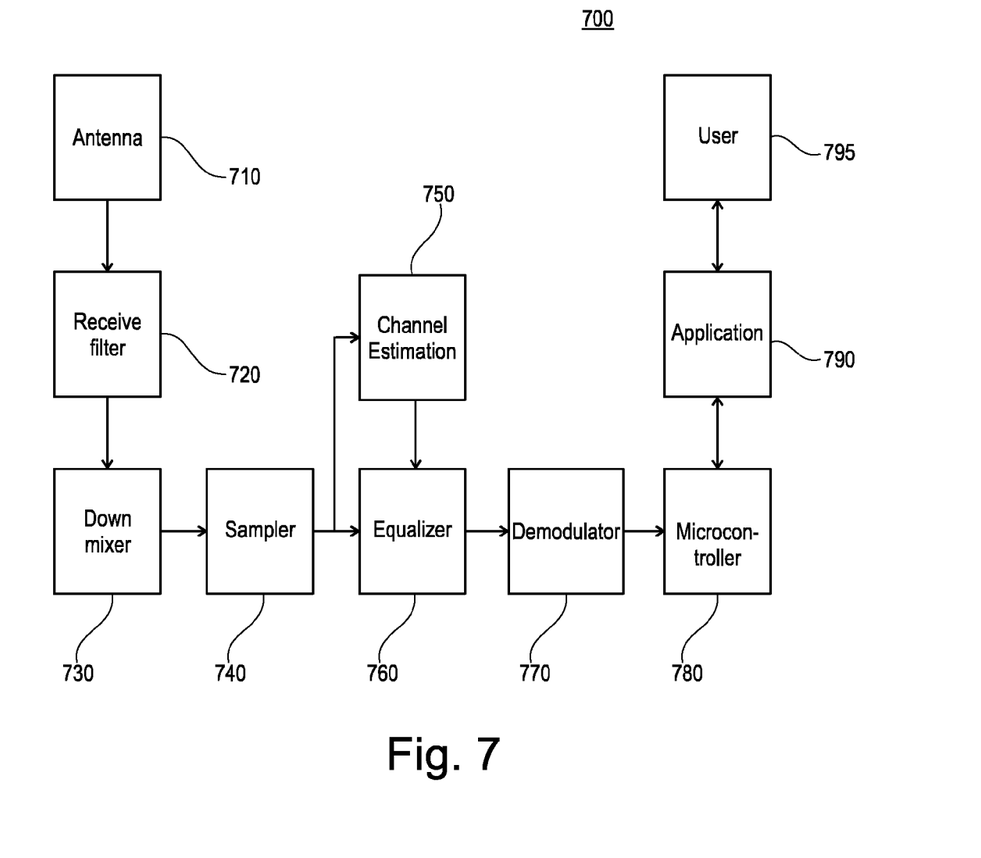
FIG. 7 illustrates a schematic block representation of a wireless communication system including a channel estimator.

FIG. 7 illustrates a schematic block representation of a wireless receiver system 700 including a channel estimator as described in one or more of the examples or embodiments described herein before. The wireless receiver system 700 may comprise an antenna 710 for receiving a wireless signal. The antenna 710 may be configured to convert radio waves emitted by a base station into an electrical signal to be processed by the system. The antenna 710 may be further connected to a receive filter 720 which can be, for example, a pulse forming filter like, for example, a root raised cosine filter. An output of the receive filter 720 may be connected to a downmixer 730 which converts the signal from a carrier frequency to a baseband signal centered at 0 Hz. In mobile telephone communication systems the carrier frequency lies typically in a range from 1 to 2 GHz. An output of the downmixer 730 may be connected to a sampler 740 which samples the analog signal with a sampling rate and converts the sampled signal values from the analog to the digital domain. The digital values output by the sampler 740 may then be supplied to an equalizer 760 and also to a channel estimator 750. The channel estimator 750 in general estimates the distortions of the data signal applied by the channel and the system and the equalizer 760 attempts to undo these distortions. The channel estimator 750 can be configured according to any one of the examples or embodiments in this application or may have any one or more of the features or functions as described herein before. In particular, the estimator 750 may comprise a first estimation unit and a second estimation unit as was described above. An output of the channel estimator 750 may be connected to the equalizer 760 to supply the estimate of h to the equalizer 760. An output of the equalizer 760 may be connected to a demodulator 770 which demodulates the signal according to the modulation scheme which was employed when transmitting the signal at the base station (for example PSK, phase shift keying). As a result the demodulator 770 converts the received signal into one or more (typically binary) data streams. An output of the demodulator 770 may be connected to a microcontroller 780 which is the main data processing unit in the system. The microcontroller 780 includes or is connected with an application software 790 which is currently being run on the system and handled by a user 795. The components 120-190 may be part of a receiver module, in particular may be integrated on a single chip having an antenna port connected to the antenna 710.

EXAMPLES

Example 1 is a method of channel estimation in a multiple carrier communication system, the communication system comprising a number of sources, the method comprising receiving a signal comprising a symbol-carrier matrix, the symbol-carrier matrix comprising a predetermined pattern of reference symbols, the reference symbols comprising a target reference symbol, determining a first channel estimate vector based on demodulating received reference symbols with known reference symbols, and determining a second channel estimate vector by multiplying the first channel estimate vector with an interference cancellation matrix, wherein the second channel estimate vector includes an interference cancelled channel estimate at a position of the target reference symbol.

In Example 2, in the subject matter of Example 1, each one of the known reference symbols comprises a pseudo-random PSK, QPSK or QAM bit sequence wherein each one of the bit sequences is representative for one of the sources.

In Example 3, in the subject matter of anyone of examples 1-2, the first channel estimate vector comprises a number S of first channel estimates corresponding to the number of sources and each one of the first channel estimates is associated with one of the sources.

In Example 4, in the subject matter of Example 3, each one of the first channel estimates is determined on the basis of a scalar product between a reference symbol vector and a weight component vector, wherein the reference symbol vector comprises received reference symbols demodulated with one particular known source-related reference symbol, and the weight component vector comprises weight components of the received reference symbols.

In Example 5, in the subject matter of Example 4, the weight components are determined on the basis of one or more of a Doppler estimation and a delay spread estimation.

In Example 6, in the subject matter of anyone of Examples 4-5, the reference symbol vector comprises a number N of received reference symbols corresponding to a number N of reference symbol positions including the target reference symbol and N−1 reference symbols disposed in an environment of the target reference symbol in the symbol-carrier matrix.

In Example 7, in the subject matter of anyone of Examples 1-6, determining the second channel estimate vector comprises providing a weight component vector and a cross-talk component vector, both of them being related to a number N of reference symbol positions including the target reference symbol and N−1 reference symbols disposed in an environment of the target reference symbol in the symbol-carrier matrix.

In Example 8, in the subject matter of Example 7, the interference cancellation matrix is determined on the basis of a scalar product between the weight component vector and the cross-talk component vector, wherein the weight component vector comprises weight components of the received reference symbols at the N reference symbol positions and the cross-talk component vector comprises cross-talk components between different known reference symbols at the N reference symbol positions, respectively.

In Example 9, in the subject matter of Example 8, an interference crosstalk matrix is determined according to Eq. (5) and the interference cancellation matrix is determined on the basis of the interference crosstalk matrix.

In Example 10, in the subject matter of Example 9, the interference cancellation matrix is determined on the basis of the inverse of the interference crosstalk matrix.

In Example 11, the subject matter of anyone of Examples 1-10, determining further channel estimates by interpolation on the basis of the interference cancelled channel estimate at the target reference symbol position.

In Example 12, in the subject matter of anyone of Examples 1-11, the method is carried out in a user equipment operating within a homogeneous network or a heterogeneous network.

Example 13 is a method of interference cancellation in a multiple carrier communication system, the communication system comprising a serving cell and at least one neighbouring cell, the method comprising receiving a signal comprising a symbol-carrier matrix, the symbol-carrier matrix comprising a predetermined pattern of reference symbols, the reference symbols comprising a target reference symbol, determining first channel estimates, each one of the first channel estimates being associated with one of the serving cell and the at least one neighbouring cell, and determining second channel estimates at the target reference symbol by filtering the first channel estimates with an interference cancellation matrix.

In Example 14, in the subject matter of Example 13, the first channel estimates including residual interference components, and the second channel estimates are free of interference components.

In Example 15, the subject matter of anyone of Examples 11-14 can optionally include providing weight components at a number N of reference symbol positions including the target reference symbol and N−1 reference symbols disposed in an environment of the target reference symbols in the symbol-carrier matrix, and utilizing the weight components for determining the first channel estimates and the second channel estimates.

In Example 16, the subject matter of Example 15 can optionally include selecting a particular set of pre-stored weight components on the basis of transmission conditions.

In Example 17, in the subject matter of anyone of Examples 11-16 the method is carried out in a user equipment and one or more of the serving cell and the at least one neighbouring cell is a macro eNodeB, a pico eNodeB, a femto eNodeB, and a relay.

Example 18 is a device for a multiple carrier communication system, the communication system comprising a number of sources disposed in a serving cell and at least one neighbouring cell, respectively, the device comprising an antenna port configured to receive a signal comprising a symbol-carrier matrix, the symbol carrier matrix comprising a predetermined pattern of reference symbols, the reference symbols comprising a target reference symbol, a first channel estimation unit configured to determine a first channel estimate vector based on demodulating received reference symbols with known reference symbols, and a second channel estimation unit configured to determine a second channel estimate vector by multiplying the first channel estimate vector with an interference cancellation matrix, wherein the second channel estimate vector includes an interference cancelled channel estimate at a position of the target reference symbol.

In Example 19, the subject matter of Example 18 can optionally include the device comprises at least one demodulation unit configured to demodulate received reference symbols with known reference symbols.

In Example 20, the subject matter of anyone of Examples 18-19 can optionally include the device further comprises a storage unit configured to store weight components of a number N of reference symbol positions including the target reference symbols and N−1 reference symbols disposed in an environment of the target reference symbol in the symbol-carrier matrix.

In Example 21, the subject matter of anyone of Examples 16-18 can optionally include the device further comprises a storage unit configured to store the interference cancellation matrix.

In Example 22, the subject matter of anyone of Examples 18-20 can optionally include the second channel estimation unit comprises a calculation unit configured to calculate the second channel estimate vector.

Example 23 is a user equipment for a multiple carrier communication system, the communication system comprising a serving cell and at least one neighbouring cell, the user equipment comprising an antenna port configured to receive a signal comprising a symbol-carrier matrix, the symbol-carrier matrix comprising a predetermined pattern of reference symbols, a first channel estimation unit configured to determine first channel estimates, each one of the first channel estimates being associated with one of the serving cell and the at least one neighbouring cell, and a second channel estimation unit configured to determine second channel estimates by filtering the first channel estimates with an interference cancellation matrix.

In Example 24, the subject matter of Example 23 can optionally include at least one demodulation unit configured to demodulate received reference symbols with known reference symbols.

In Example 25, in the subject matter of anyone of Example 23-24, the user equipment further comprises a storage unit configured to store weight components of a number N of reference symbol positions including the target reference symbols and N−1 reference symbols disposed in an environment of the target reference symbol in the symbol-carrier matrix.

In Example 26, the subject matter of anyone of Examples 21-23, the user equipment further comprises a storage unit configured to store an interference cross-talk matrix and a calculation unit configured to calculate the interference cancellation matrix on the basis of the interference cross-talk matrix.

In Example 27, the subject matter of anyone of Examples 23-27, the second channel estimation unit comprises a calculation unit configured to calculate the second channel estimate vector.

Example 28 is a device for a multiple carrier communication system, the communication system comprising a number of sources disposed in a serving cell and at least one neighbouring cell, respectively, the user equipment comprising means for receiving a signal comprising a symbol-carrier matrix, the symbol-carrier matrix comprising a predetermined pattern of reference symbols, the reference symbols comprising a target reference symbol, means for determining a first channel estimate vector based on demodulating received reference symbols with known reference symbols, and means for determining a second channel estimate vector by multiplying the first channel estimate vector with an interference cancellation matrix, wherein the second channel estimate vector includes an interference cancelled channel estimate at a position of the target reference symbol.

In Example 29, in the subject matter of Example 28, the device further comprises at least one means for demodulating received reference symbols with known reference symbols.

In Example 30, in the subject matter of anyone of Examples 28-29, the device further comprises means for storing weight components of a number N of reference symbol positions including the target reference symbols and N−1 reference symbols disposed in an environment of the target reference symbol in the symbol-carrier matrix.

In Example 31, in the subject matter of anyone of Example 28-30, the device further comprises means for storing the interference cancellation matrix.

In Example 32, in the subject matter of anyone of Examples 28-31, the means for determining a second channel estimate vector comprises means for calculating the second channel estimate vector.

Example 33 is a user equipment for a multiple carrier communication system, the communication system comprising a serving cell and at least one neighbouring cell, the user equipment comprising means for receiving a signal comprising a symbol-carrier matrix, the symbol-carrier matrix comprising a predetermined pattern of reference symbols, means for determining first channel estimates, each one of the first channel estimates being associated with one of the serving cell and the at least one neighbouring cell, and means for determining second channel estimates by filtering the first channel estimates with an interference cancellation matrix.

In Example 34, in the subject matter of Example 33, the user equipment further comprises means for demodulating received reference symbols with known reference symbols.

In Example 35, in the subject matter of anyone of Examples 33-34, the user equipment further comprises means for storing weight components of a number N of reference symbol positions including the target reference symbols and N−1 reference symbols disposed in an environment of the target reference symbol in the symbol-carrier matrix.

In Example 36, the subject matter of anyone of Examples 33-35, the user equipment further comprises means for storing an interference cross-talk matrix and means for calculating the interference cancellation matrix on the basis of the interference cross-talk matrix.

In Example 37, in the subject matter of anyone of Examples 33-36 the means for determining second channel estimates further comprises means for calculating the second channel estimates.

Example 38 is a computer program product for a receiver in communication system comprising a number of sources disposed in a serving cell and at least one neighbouring cell, respectively, comprising a computer-readable medium having program code recorded thereon, the program code comprising a program code configured to determine a first channel estimate vector based on demodulating received reference symbols with known reference symbols, and a program code configured to determine a second channel estimate vector by multiplying the first channel estimate vector with an interference cancellation matrix.

Example 39 is a computer program product for a receiver in a communication system comprising a serving cell and at least one neighbouring cell, comprising a computer-readable medium having program code recorded thereon, the program code comprising a program code configured to determine first channel estimates, each one of the first channel estimates being associated with one of the serving cell and the at least one neighbouring cell, and a program code configured to determine second channel estimates by filtering the first channel estimates with an interference cancellation matrix.

What is claimed is:

1. A method of channel estimation in a multiple carrier communication system, the communication system comprising a number of sources, the method comprising:
    receiving a signal comprising a symbol-carrier matrix, the symbol-carrier matrix comprising a predetermined pattern of reference symbols, the reference symbols comprising a target reference symbol;
    determining a first channel estimate vector based on demodulating received reference symbols with known reference symbols; and
    determining a second channel estimate vector by providing a weight component vector and a cross-talk component vector, wherein the weight component vector and the cross-talk component vector are related to a number N of reference symbol positions including the target reference symbol and N−1 reference symbols disposed in an environment of the target reference symbol in the symbol-carrier matrix, and by multiplying the first channel estimate vector with an interference cancellation matrix, wherein the second channel estimate vector includes an interference cancelled channel estimate at a position of the target reference symbol.

2. The method according to claim 1, wherein
    each one of the known reference symbols comprises a pseudo-random PSK, QPSK or QAM bit sequence wherein each one of the bit sequences is representative for one of the sources.

3. The method according to claim 1, wherein
    the interference cancellation matrix is determined on the basis of a scalar product between the weight component vector and the cross-talk component vector, wherein the weight component vector comprises weight components of the received reference symbols at the N reference symbol positions and the cross-talk component vector comprises cross-talk components between different known reference symbols at the N reference symbol positions, respectively.

4. The method according to claim 1, further comprising:
determining further channel estimates by interpolation on the basis of the interference cancelled channel estimate at the target reference symbol position.

5. The method according to claim 1, wherein
the method is carried out in a user equipment operating within a homogeneous network or a heterogeneous network.

6. A method of channel estimation in a multiple carrier communication system, the communication system comprising a number of sources, the method comprising:
receiving a signal comprising a symbol-carrier matrix, the symbol-carrier matrix comprising a predetermined pattern of reference symbols, the reference symbols comprising a target reference sybol;
determining a first channel estimate vector based on demodulating received reference symbols with known reference symbols, wherein the first channel estimate vector comprises a number S of first channel estimates corresponding to the number of sources and each one of the first channel estimates is associated with one of the sources, and wherein
each one of the first channel estimates is determined on the basis of a scalar product between a reference symbol vector and a weight component vector, wherein the reference symbol vector comprises received reference symbols demodulated with one particular known source-related reference symbol, and the weight component vector comprises weight components of the received reference symbols; and
determining a second channel estimate vector by multiplying the first channel estimate vector with an interference cancellation matrix, wherein the second channel estimate vector includes an interference cancelled channel estimate at a position of the target reference symbol.

7. The method according to claim 6, where
the weight components are determined on the basis of one or more of a Doppler estimation and a delay spread estimation.

8. The method according to claim 6, wherein
the reference symbol vector comprises a number N of received reference symbols corresponding to a number N of reference symbol positions including the target reference symbol and N−1 reference symbols disposed in an environment of the target reference symbol in the symbol-carrier matrix.

9. A method of interference cancellation in a multiple carrier communication system, the communication system comprising a serving cell and at least one neighbouring cell, the method comprising:
receiving a signal comprising a symbol-carrier matrix, the symbol-carrier matrix comprising a predetermined pattern of reference symbols, the reference symbols comprising a target reference symbol;
determining first channel estimates, each one of the first channel estimates being associated with one of the serving cell and the at least one neighbouring cell;
determining second channel estimates at the target reference symbol by filtering the first channel estimates with an interference cancellation matrix;
providing weight components at a number N or reference symbol positions including the target reference symbol and N−1 reference symbols disposed in an environment of the target reference symbols in the symbol-carrier matrix; and
utilizing the weight components for determining the first channel estimates and the second channel estimates.

10. The method according to claim 9, wherein
the first channel estimates including residual interference components, and
the second channel estimates are free of interference components.

11. The method according to claim 9, further comprising:
selecting a particular set of pre-stored weight components on the basis of transmission conditions.

12. The method according to claim 9, wherein
the method is carried out in a user equipment and one or more of the serving cell and the at least one neighbouring cell is a macro eNodeB, a pico eNodeB, a femto eNodeB, and a relay.

13. A device for a multiple carrier communication system, the communication system comprising a number of sources disposed in a serving cell and at least one neighbouring cell, respectively, the device comprising:
an antenna port configured to receive a signal comprising a symbol-carrier matrix, the symbol carrier matrix comprising a predetermined pattern of reference symbols, the reference symbols comprising a target reference symbol;
a first channel estimation unit configured to determine a first channel estimate vector based on demodulating received reference symbols with known reference symbols; and
a second channel estimation unit configured to determine a second channel estimate vector by providing a weight component vector and a cross-talk component vector, both of them being related to a number N of reference symbol positions including the target reference symbol and N−1 reference symbols disposed in an environment of the target reference symbol in the symbol-carrier matrix, and by multiplying the first channel estimate vector with an interference cancellation matrix, wherein the second channel estimate vector includes an interference cancelled channel estimate at a position of the target reference symbol.

14. The device according to claim 13, wherein
the device comprises at least one demodulation unit configured to demodulate received reference symbols with known reference symbols.

15. The device according to claim 13, wherein
the device further comprises a storage unit configured to store weight components of a number N of reference symbol positions including the target reference symbols and N−1 reference symbols disposed in an environment of the target reference symbol in the symbol-carrier matrix.

16. The device according to claim 13, wherein
the device further comprises a storage unit configured to store the interference cancellation matrix.

17. The device according to claim 13, wherein
the second channel estimation unit comprises a calculation unit configured to calculate the second channel estimate vector.

18. A user equipment for a multiple carrier communication system, the communication system comprising a serving cell and at least one neighbouring cell, the user equipment comprising:

an antenna port configured to receive a signal comprising a symbol-carrier matrix, the symbol-carrier matrix comprising a predetermined pattern of reference symbols;

a first channel estimation unit configured to determine first channel estimates, each one of the first channel estimates being associated with one of the serving cell and the at least one neighbouring cell;

a second channel estimation unit configured to determine second channel estimates by filtering the first channel estimates with an interference cancellation matrix, and a storage unit configured to provide weight components at a number N of reference symbol positions including the target reference symbol and N−1 reference symbols disposed in an environment of the target reference symbols in the symbol-carrier matrix;

wherein the weight components are utilized for determining the first channel estimates and the second channel estimates.

19. The user equipment according to claim 18, further comprising:

at least one demodulation unit configured to demodulate received reference symbols with known reference symbols.

20. The user equipment according to claim 18, wherein the user equipment further comprises a storage unit configured to store weight components of a number N of reference symbol positions including the target reference symbols and N−1 reference symbols disposed in an environment of the target reference symbol in the symbol-carrier matrix.

21. The user equipment according to claim 18, wherein the user equipment further comprises a storage unit configured to store an interference cross-talk matrix and a calculation unit configured to calculate the interference cancellation matrix on the basis of the interference cross-talk matrix.

22. The user equipment according to claim 18, wherein the second channel estimation unit comprises a calculation unit configured to calculate the second channel estimate vector.

23. A device for a multiple carrier communication system, the communication system comprising a number of sources disposed in a serving cell and at least one neighbouring cell, respectively, the user equipment comprising:

means for receiving a signal comprising a symbol-carrier matrix, the symbol-carrier matrix comprising a predetermined pattern of reference symbols, the reference symbols comprising a target reference symbol;

means for determining a first channel estimate vector based on demodulating received reference symbols with known reference symbols; and means for determining a second channel estimate vector by providing a weight component vector and a cross-talk component vector, both of them being related to a number N of reference symbol positions including the target reference symbol and N−1 reference symbols disposed in an environment of the target reference symbol in the symbol-carrier matrix, and by multiplying the first channel estimate vector with an interference cancellation matrix, wherein the second channel estimate vector includes an interference cancelled channel estimate at a position of the target reference symbol.

24. The device according to claim 23, wherein the device further comprises at least one means for demodulating received reference symbols with known reference symbols.

25. The device according to claim 23, wherein the device further comprises means for storing weight components of a number N of reference symbol positions including the target reference symbols and N−1 reference symbols disposed in an environment of the target reference symbol in the symbol-carrier matrix.

26. The device according to claim 23, wherein the device further comprises means for storing the interference cancellation matrix.

27. The device according to claim 26, wherein the means for determining a second channel estimate vector comprises means for calculating the second channel estimate vector.

28. A user equipment for a multiple carrier communication system, the communication system comprising a serving cell and at least one neighbouring cell, the user equipment comprising:

means for receiving a signal comprising a symbol-carrier matrix, the symbol-carrier matrix comprising a predetermined pattern of reference symbols;

means for determining first channel estimates, each one of the first channel estimates being associated with one of the serving cell and the at least one neighbouring cell;

means for determining second channel estimates by filtering the first channel estimates with an interference cancellation matrix; and means for providing weight components at a number N of reference symbol positions including the target reference symbol and N−1 reference symbols disposed in an environment of the target reference symbols in the symbol-carrier matrix;

wherein the weight components are utilized for determining the first channel estimates and the second channel estimates.

29. The user equipment according to claim 28, wherein the user equipment further comprises means for demodulating received reference symbols with known reference symbols.

30. The user equipment according to claim 28, wherein the user equipment further comprises means for storing weight components of a number N of reference symbol positions including the target reference symbols and N−1 reference symbols disposed in an environment of the target reference symbol in the symbol-carrier matrix.

31. The user equipment according to claim 28, wherein the user equipment further comprises means for storing an interference cross-talk matrix and means for calculating the interference cancellation matrix on the basis of the interference cross-talk matrix.

32. The user equipment according to claim 28, wherein the means for determining second channel estimates further comprises means for calculating the second channel estimates.

33. A computer program product, embodied in a non-transitory storage medium, for a receiver in communication system comprising a number of sources disposed in a serving cell and at least one neighbouring cell, respectively, comprising:

the non-transitory storage medium having program code recorded thereon, the program code comprising:

a program code configured to determine a first channel estimate vector based on demodulating received reference symbols with known reference symbols; and a program code configured to determine a second channel estimate vector by providing a weight component vector and a cross-talk component vector, both of them being related to a number N of reference symbol positions including the target reference symbol and N−1 reference symbols disposed in an environment of the target reference symbol in the symbol-carrier matrix, and by multiplying the first channel estimate vector with an interference cancellation matrix.

34. A computer program product, embodied in a non-transitory storage medium, for a receiver in a communication system comprising a serving cell and at least one neighbouring cell, comprising:

the non-transitory storage medium having program code recorded thereon, the program code comprising:

a program code configured to determine first channel estimates, each one of the first channel estimates being associated with one of the serving cell and the at least one neighbouring cell;

a program code configured to determine second channel estimates by filtering the first channel estimates with an interference cancellation matrix;

a program code configured to provide weight components at a number N of reference symbol positions including the target reference symbol and N−1 reference symbols disposed in an environment of the target reference symbols in the symbol-carrier matrix; and a program code configured to utilize the weight components for determining the first channel estimates and the second channel estimates.

* * * * *